United States Patent [19]

Auger

[11] 4,142,513

[45] Mar. 6, 1979

[54] HYBRID SOLAR COLLECTOR

[76] Inventor: Raymond N. Auger, 709 Spruce St., Aspen, Colo. 81611

[21] Appl. No.: 772,908

[22] Filed: Feb. 28, 1977

[51] Int. Cl.² .............................................. F24J 3/02
[52] U.S. Cl. .................................................. 126/271
[58] Field of Search ............... 126/270, 271; 237/1 A; 165/170, 171, 172

[56] References Cited

U.S. PATENT DOCUMENTS

| | | | |
|---|---|---|---|
| 3,450,192 | 6/1969 | Hay | 126/270 |
| 3,859,980 | 1/1975 | Crawford | 126/271 |
| 3,868,945 | 3/1975 | Konopka | 126/271 |
| 3,893,506 | 7/1975 | Laing | 126/271 |
| 3,991,742 | 11/1976 | Gerber | 126/271 |

Primary Examiner—Kenneth W. Sprague
Assistant Examiner—James C. Yeung

[57] ABSTRACT

A flat plate hydronic solar collector combining features of both the trickle and pressurized type of collector and also of metal and plastic collectors, the invention consisting of a plastic film tube divided into pockets into which heat transfer liquid flows by gravity, moving through a multiple number of pockets as the liquid progresses through the tube, removing heat from the side of the tube facing the sun, the pressure in each pocket being limited by the depth of the pocket. An important embodiment of the invention has a metal solar energy absorber plate secured over the film tube and its mounting surface so that the swelling of the film tube causes it to make extensive contact with the metal absorber.

20 Claims, 4 Drawing Figures

HYBRID SOLAR COLLECTOR

BACKGROUND OF THE INVENTION

This invention relates to a solar heat collector designed to transfer solar energy to a liquid. Past designs of liquid heating solar colectors have been of two general types: those pressurized throughout and those which utilize gravity to create liquid flow over an absorber surface, these being commonly known as trickle, gravity-flow or open collectors, one of the most well-known of which is the subject of U.S. Pat. No. 3,360,539 by Thomason. With regard to materials, most collectors are made of either metal or plastic.

A major advantage of trickle type collectors is that they do not require the construction of pressurized spaces or the use of extensive lengths of tubing in their manufacture, but their problems include the fact that at low liquid flow rates there is poor thermal contact between the absorber and the liquid because of non-uniform liquid distribution. To prevent evaporation and cooling, the wetted surface of the absorber must be contained in an essentially vaportight enclosure. This has been accomplished by placing one or more layers of glazing over the absorber surface. The cost of this glazing is a significant part of the collector's cost. Condensation on this glazing tends to reduce light transmission through it. Sealing the glazing economically and in a vapor-tight manner has also been a problem.

Ying-Nien Yu, in U.S. Pat. No. 3,943,911, discloses the use of a thin plastic film over the absorber surface to assist in evenly spreading the liquid over the absorber. He also proposes the use of the plastic film as the absorber itself. However, many plastics deteriorate when exposed to sunlight, and when used with a rigid frame to seal their edges, they wrinkle as the result of thermal expansion and contraction, Wrinkling disturbes the even and uniform flow of liquid. Although some plastic films are stiff and do not wrinkle unless stressed in some manner, other plastic films which might be suitable for use in a collector are very soft and must be kept under tension for them to lie flat and free of wrinkles.

A major advantage in the use of plastics in solar collectors is the absence of corrosion problems. However, low-cost plastics, such as polyethylene, deteriorate when exposed to sunlight and melt at relatively low temperatures. Consequently, the use of glazing over plastic collectors is usually hazardous because a temporary loss of liquid flow might result in the plastic being heated to the melting point. Plastics which are able to withstand relatively high temperatures and exposure to sunlight tend to be expensive. Efforts to offset the loss of strength as the result of temperature or prolonged sun exposure by increasing the thickness of the plastic in a collector also tend to reduce the efficiency of the collector, as most plastics tend to be relatively poor heat conductors. No economical way has been found to solve these problems of plastic collectors. The present invention, however, offers solutions to these problems and also provides other advantages.

SUMMARY OF THE INVENTION

It is the major object of the invention to combine the simplicity and low cost of trickle type collectors with the higher efficiency of pressurized collectors.

Another object is the use of high temperature plastics, such as nylon and teflon, in thin film form, to reduce the quantity of plastic used.

Another object is to combine the advantages of plastics, especially the lack of corrosion problems, with the advantages of metals, such as strength and tolerance to sunlight.

Another object of the invention is to permit the construction of a collector consisting of a thin metal and plastic absorber combination to permit the flow of heat from the absorber surface to the plastic-contained liquid with minimum heat flow resistance.

Another object of the invention is to permit the assembly of a solar heat collector using very light materials to facilitate installation.

Another object is to permit the assembly of a collector on a flat wooden surface without the need for a frame structure around the edge of the collector.

Another object is to enable at least one exterior wall of a mobile home to act as a solar collector or radiator with minimum modification of the conventional design of such walls.

Other objects become apparent from the following disclosure.

Basically, the collector comprises a thin film tube sealed in a manner which gives it the properties which are the objects of the invention. A pipe is connected to the upper end of the thin film tube to allow the flow of liquid into the tube. The thin film tube is mounted on a vertical or inclined surface so that liquid passes through the tube by gravity to a gutter-like pipe at the lower end of the tube. Flow within the tube is restrained by a series of pockets which are formed by sealing opposite sides of the tube. In a preferred embodiment of the invention, the pockets are arranged so that the liquid passing through the tube flows from pocket to pocket. Because the liquid in each pocket makes constant static-pressure contact with the sun-facing side of each pocket, it is appropriate to consider each pocket a small pressurized flat plate collector. However, as liquid moves through the collector by gravitational force, the collector has the characteristics of trickle type devices when considered as a liquid conduit in a circulation loop. For these reasons, the invention is called a hybrid.

In a preferred embodiment of the invention, the thin plastic film tube is located between a thin metal solar absorber sheet and a rear supporting surface. The metal absorber sheet provides both physical and solar protection for the thin film tube. Expansion of the pockets in the space between the absorber and the rear supporting surface tends to press the pockets against the absorber, creating close contact for the efficient transmission of heat from the absorber to the liquid in the pockets.

There are two general methods of creating pocket structures within the film tube: the first is to seal opposite sides of the tube by means of conventional heat-sealing techniques or through the use of solvents or adhesives; the second is through the use of compliant restrictions in the tube, the detailed description of which follows.

There are three general methods by which liquid can be passed through the pockets: the first is by overflow of each pocket; the second is by means of a mechanism which releases liquid from each pocket after the liquid in it has attained a certain depth; and the third is by one or more passages in the walls of each pocket which will enable continuous flow more or less proportional to the depth of liquid in each pocket.

These various methods of pocket construction and liquid movement through the pockets may be combined. The primary advantage of passages which permit continuous flow is that they permit the pockets to drain during periods of collector non-use. The primary advantage of using pocket liquid depth as a controlling factor in liquid flow through a system of pockets is that each pocket may be filled and provide liquid contact with its sunward surface at low flow rates and at higher flow rates there is no cumulative pressure transmission through the film tube structure; the pressure in each pocket remains more or less constant regardless of flow rate. This enables the film tube structure to be made of thin plastic film.

The construction of a compliant restriction mechanism for the control of liquid depth in each pocket may take various forms. One of these is to place a film tube in a sandwich structure, at least one layer of which is composed of a stiff material, such a thin metal sheet, formed with ridges which face inwards towards the film tube. This metal sheet is is mounted in a manner which causes the ridges to pinch the film tube against a rigid surface, creating at least, and preferably, a partial seal to liquid movement. Liquid collecting behind each seal exerts pressure on the sandwich, deflecting the metal sheet outwards and releasing the seal, allowing liquid to flow to the next pocket. A variety of other methods may be used to create pinch seals. For example, strips of spring steel may be pressed against a film tube, these strips located in a manner which allows liquid pockets to form above them, these pockets developing sufficient pressure to flex the metal strips outward, releasing the pinch seal.

One of the objects of the present invention is to permit the use of used offset printing plates in the construction of solar collectors. These plates are of a suitable thickness and size for use as absorber sheets with film tubes which have heat-sealed pockets, or these aluminum sheets may be ridged to create pinch-seal structures.

Most mobile homes manufactured today have exterior siding made of ridged aluminum sheets attached to a plywood surface. In many instances, these ridges are vertical and face outward. By the use of inward-facing ridges, properly spaced for the thickness of the aluminum sheet used and the width of the film tube use, these mobile homes may have one or more of their walls used as solar heat collectors or as night-time heat radiators with the only additional expense above present construction cost being the inclusion of the film tubes in the wall structure and the addition of the appropriate plumbing to supply liquid to the film tubes and remove it from the lower edge of the wall. Liquid for the system may be stored in drums under the mobile home.

DRAWING DESCRIPTION

DETAILED DESCRIPTION

The word "pocket" as used in this specification indicates a structure which will retain a quantity of liquid at least three times greater than would be contained in the tube during unhindered gravity flow through a film tube of the same material at the same angle. As an additional definition, any seal pattern in a film tube which causes the major part of the film tube to bulge outward above the seal pattern during liquid flow accomplishes the function of creating "pockets" in the film tube. As a further refinement of the definition, it is the property of a pocket made according to these specifications to retain liquid flow in a manner which creates a unique zone of static pressure, this static pressure not being transmitted to other pockets in a cumulative fashion. As an additional further refinement of the definition, pockets made according to this specification will cause a maximum of film tube surface to be in contact with circulating liquid under positive pressure throughout a range of flow rates without permitting cumulative pressure increase down the length of the collector. There are a variety of sealing patterns and sealing structures able to produce pockets which perform according to these specifications. The importance of pocket designs which do not allow cumulative increases in pressure down the length of a film tube nor substantial increases of pressure with increasing flow rate is that a film tube made with such pockets may be made of a thin plastic which need be no stronger than required to support the liquid depth in each separate pocket. If such a film tube is used in a sandwich with an aluminum cover plate, that plate need be no stronger than required to withstand the pressure within each pocket resulting from the depth of liquid in that pocket, Various pocket designs are illustrated by the drawings.

Figure 1:
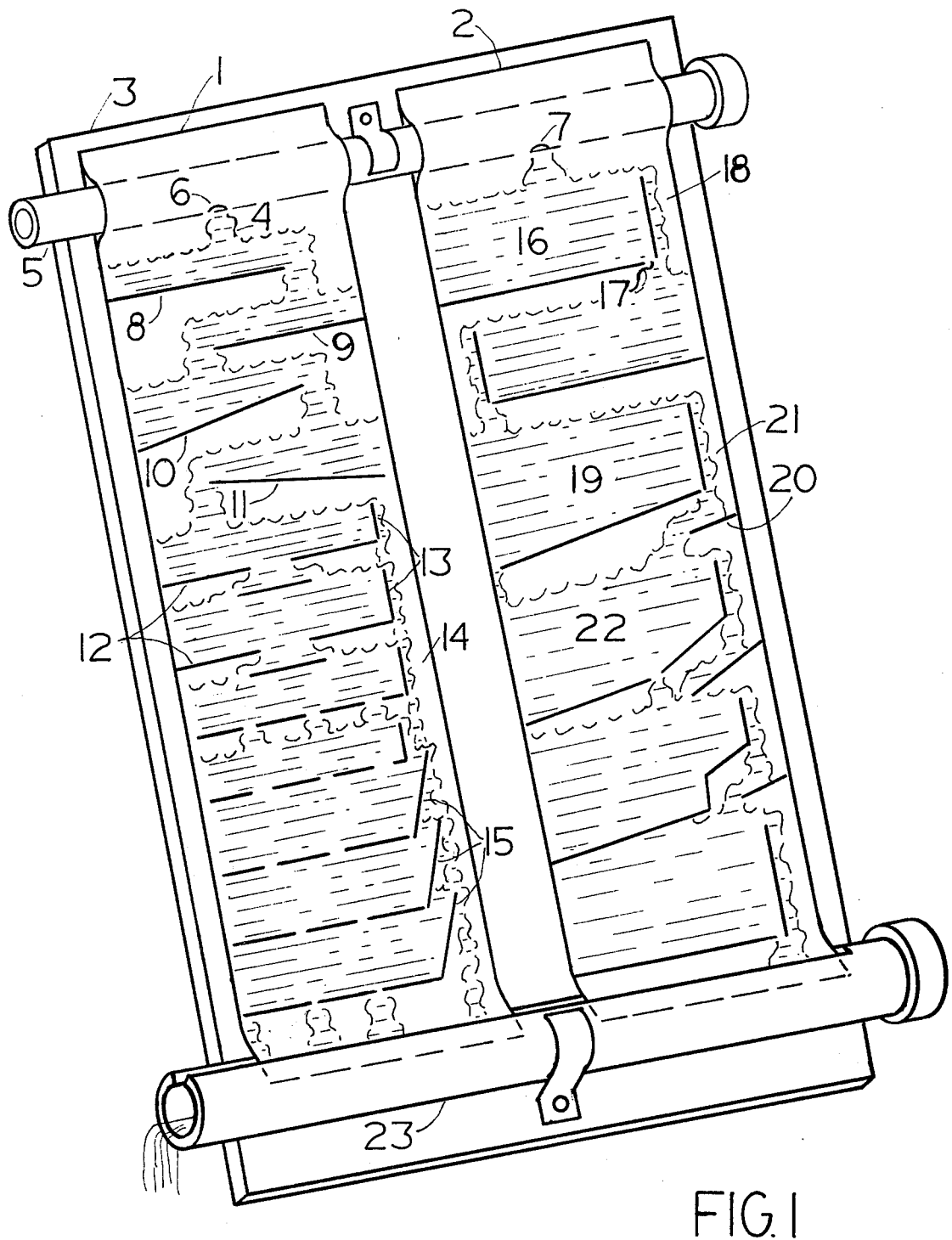
FIG. 1 is a perspective view of two collectors made according to the present invention shown as though made with transparent plastic to illustrate internal liquid static and flow conditions.

FIG. 1 is a perspective view of two collectors showing liquid flowing through them and a variety of pocket designs. The two thin film tubes, 1 and 2, each having a pair of opposed and generally parallel side walls joined together at their side edges, are depicted as though transparent. In actual practice, these film tubes would be made of a darkened plastic or covered with a metal cover plate. The film tubes are mounted on a rigid surface 3 by means not shown but which might include adhesives. Liquid 4 enters the thin film tubes by means of a pipe 5 which passes through the upper end of the film tubes. Holes 6 and 7 permit the passage of liquid into the film tube from the pipe 5, which is connected to a suitable source of pressure, not shown. Seals 8 and 9 at the upper end of the left-hand tube 1, are generally perpendicular to the side edges of tube 1 and extend therebetween and each seal has an opening adjacent one of the side edges so as to require liquid to flow in a zig-zag path. This simple configuration, although lacking in various refinements, does create, under ideal conditions, some of the essential phenomina related to pocket design. As seals 8 and 9 retard liquid flow and cause liquid level to rise above each seal, thereby producing an outward bulging of the film tube, for a given rate of flow this simple seal pattern could accomplish some of the objectives of the present invention. The ideal flow rate would cause each horizontal segment of the seal pattern to be mostly filled with liquid. However, minor variations in seal pattern or wrinkling of the film tube can produce significant changes in flow resistance within the film tube. This can cause one segment of a series of segments to have a higher flow resistance than prior segments. At sufficiently high rates of flow this will cause cumulative pressure increase above the high-resistance segment. This may result in sufficiently high pressure at the high-resistance point for the film tube to rupture. The safe flow rate through such a structure may be sufficiently low as to expose only a small part of the film tube's surface to static pressure. A metal plate sandwiching such a film tube against a stiff surface can transmit heat through the metal to areas of the film tube under liquid pressure. However, a thinner metal plate can be used with equal effectiveness if the film tube uses a seal pattern which increases the area of static pressure.

Seals 10 and 11 create pockets of static liquid pressure because of the downward slope of the seals. This configuration increases the area of the film tube in liquid contact regardless of flow rate and provides a minimum surface area exposed to static pressure.

Seals 12 and 13 establish a somewhat different type of flow pattern than the seals previously described. Seal 12 is generally perpendicular to the side edges of tube 1 and has an opening intermediate its ends. Seal 13 is generally parallel to the side edges of tube 1 and is connected to one end of seal 12. These seals establish a rectangular area for the liquid pocket, with a flow baffle in the center of the pocket. As shown, the major part of the liquid flow occurs through the opening in the lower part of the pockets formed by these seals. The side seals 13 of these pockets permit overflow to a passage 14 which is located adjacent one of the side edges of tube 1. Passage 14 is intended specifically to conduct liquid in excess of that needed to fill the pockets.

The use of an overflow passage provides a means for minimizing the hazard of cumulative pressure build-up in the pocket series. The structure provides what is, in effect, a pressure regulatory mechanism for the pockets in the film tube. In the design of a series of pockets such as shown in the lower half of the film tube, each pocket may be designed to present a slightly greater restriction to flow than the one above. In this manner, all of the pockets will fill completely, with any excess liquid diverted to the overflow passage. The lower three pockets 15 of the film tube each have a first portion laterally extending between side edges of tube 1 and a second portion extending at an angle between the side edges. The first portion of pocket 15 also has a number of openings through which the liquid flows longitudinally. Pockets 15 are shown with overflow passages arranged in a manner which requires liquid level in a pocket to rise slightly above the bottom of the pocket above it before overflow may occur. With this type of seal pattern, an entire film tube may be liquid-filled, with the only air in the tube being that in the overflow passage.

The arrangement of the overflow passage in left-hand film tube 1 of FIG. 1 requires that the liquid flow rate for the structure be adjusted with some care so as to be sufficient to fill all of the pockets and yet not so great as to create major flow through the overflow path. The right-hand film tube 2 of FIG. 1 illustrates pocket designs which are less sensitive to liquid flow rate in keeping the pockets full, and yet cause all of the liquid passing through the structure to pass through pockets. The uppermost pocket 16 is illustrated with two flow paths: a slow-flow path 17 on the bottom of the pocket and a larger overflow path 18 on the side of the pocket. The slow-flow path is intended to provide overnight draining of the pocket, with the majority of liquid flow occuring by means of the overflow path.

Pocket 19 of the right-hand film tube 2 uses a diverter seal 20 which deflects liquid running down the overflow path 21 into the next lower pocket 22. This seal configuration permits the upper limit of the liquid level in each pocket to be even with the bottom of the pocket above it and yet still permit a continuous overflow passage on the right hand side of the collector. One desirable feature of a continuous flow passage on one or both sides of the collector is that it permits the escape of trapped air.

Liquid is withdrawn from the collectors by means of a gutter-like pipe 23. The top of the pipe has a slot cut in it to allow the entry of the film tube. Liquid from the tubes drains into this pipe from which it then flows by gravity.

Figure 2:
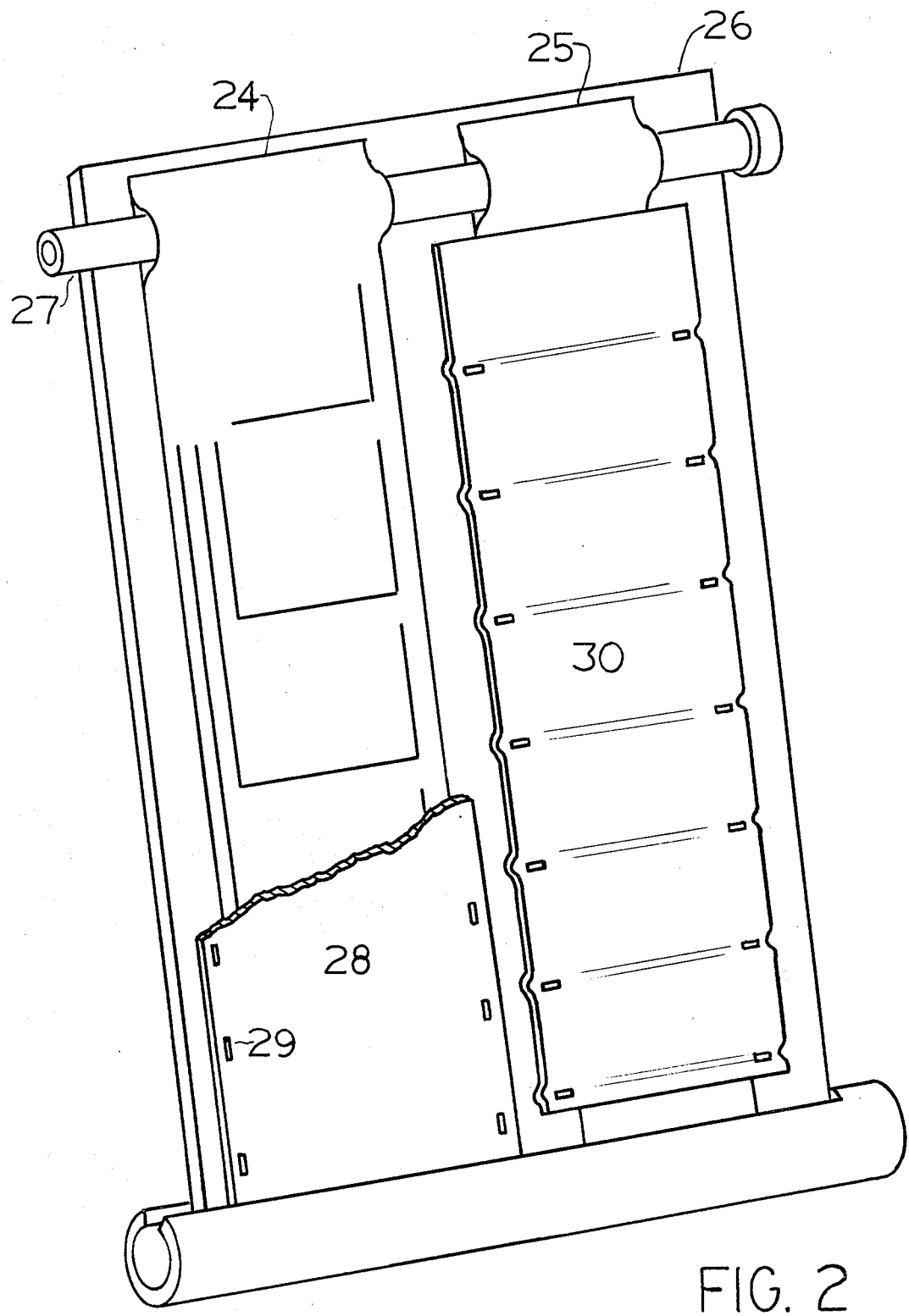
FIG. 2 is a perspective view of two collectors with metal absorber sheets, one shown in partial section.

FIG. 2. illustrates two embodiments of the invention. Two film tubes 24 and 25 are shown mounted on a common base 26, using a common upper liquid supply pipe 27. The collector on the left is shown with a metal absorber sheet 28 in partial section. The sheet is attached to the supporting surface by staples 29. The expansion of the film tube 24 as its pockets fill with liquid press the film tube against the absorber sheet, enabling heat absorbed by the sheet to flow into the liquid circulating through the film tube. The seal pattern of this film tube creates pockets which are connected in parallel with respect to liquid flow. Specifically, tube 24 has pockets which include a first portion laterally extending for a portion of the distance between the side edges of tube 24. A second portion is connected to one end of the first portion and extends in an upward direction toward pipe 27. Similarly, a third portion is connected to the other end of the first portion of the pocket. This third portion also extends in an upward direction toward pipe 27. The liquid completely fills the pockets of tube 24 before flowing out of the open, upper portion of the pocket. In contrast, FIG. 1 illustrates pocket structures which are connected in series or series-parallel. Regardless of pocket connection circuit, the pressure of liquid within the film tube is transmitted almost entirely to the absorber sheet, enabling the film tube to be made of very thin plastic.

The right hand collector 25 of FIG. 2 is covered with a ridged absorber sheet 30. The pressure of the ridges of the absorber sheet against the mounting base 26 creates pinch seals which cause liquid to build up in the film tube. The pocket of liquid above each pinch seal has a static pressure which causes the absorber sheet to bow outward, releasing the pinch seal. As a means of increasing the pressure of the pinch seal, the absorber sheet or mounting base may be bowed inward towards the center of the collector prior to assembly. In the case where the base has been bowed, pinch seals also may be created by tensioning the absorber sheet by springs along the edge of the absorber sheet. The lines of tension across the absorber sheet created by these springs will pinch the plastic tube, resulting in the same effect as the ridged absorber sheet 30 of FIG. 2.

Figure 3:
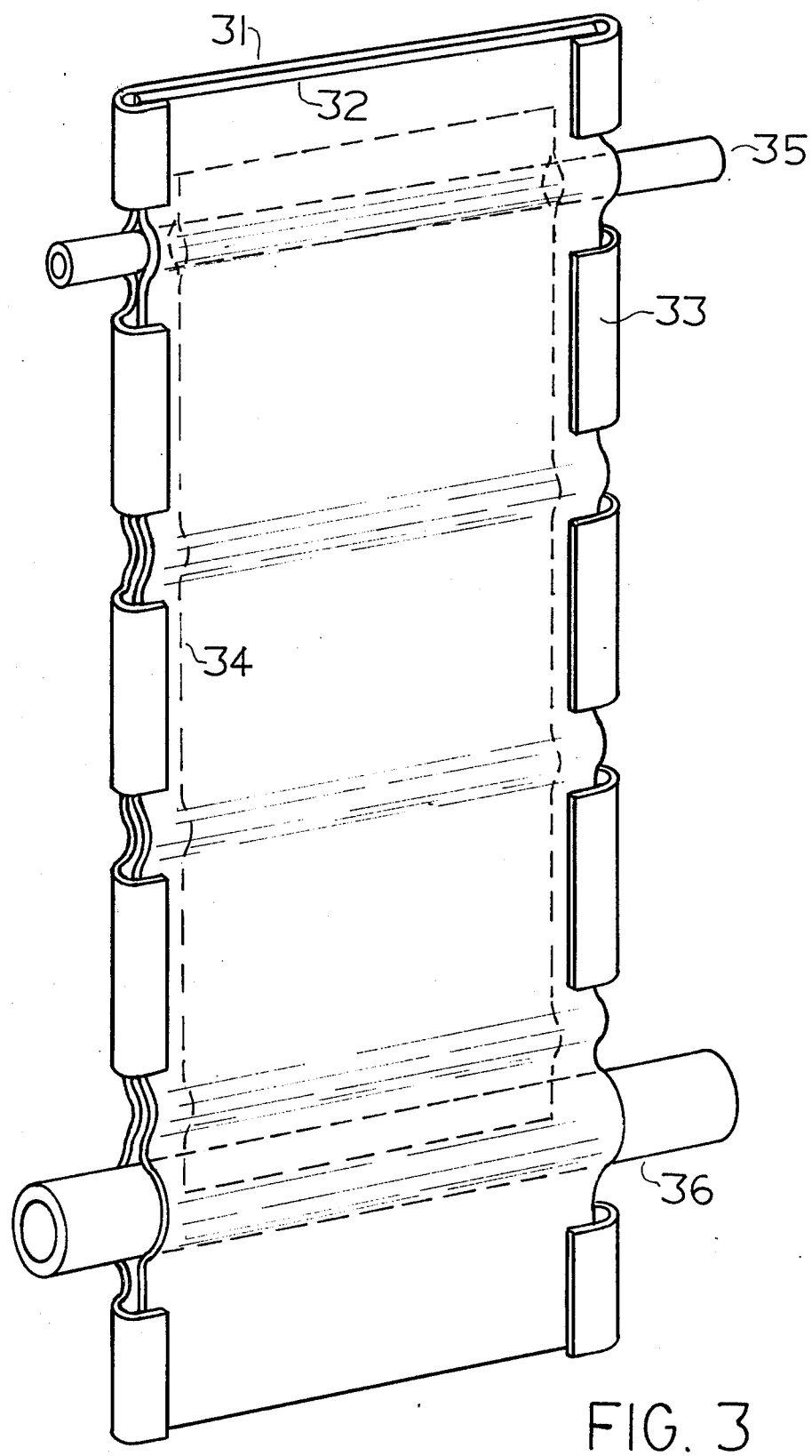
FIG. 3 is a perspective view of a collector using metal sandwich construction with pockets created by pinch sealing.

FIG. 3 illustrates the use of two ridged metal sheets to create a pinch seal for an inner film tube. The two sheets 31 and 32 are held together at their edges by tabs 33. The thin film tube 34 between the sheets is shown by dashed lines. A pipe 35 passes between the metal sheets and through the thin film tube to conduct liquid into the film tube. The bottom of the film tube is inserted in a slot cut in the top of a lower pipe 36 to conduct liquid from the collector. The two metal sheets may be formed with an inward-facing bow prior to assembly to increase the force of the pinch seal after assembly.

Figure 4:
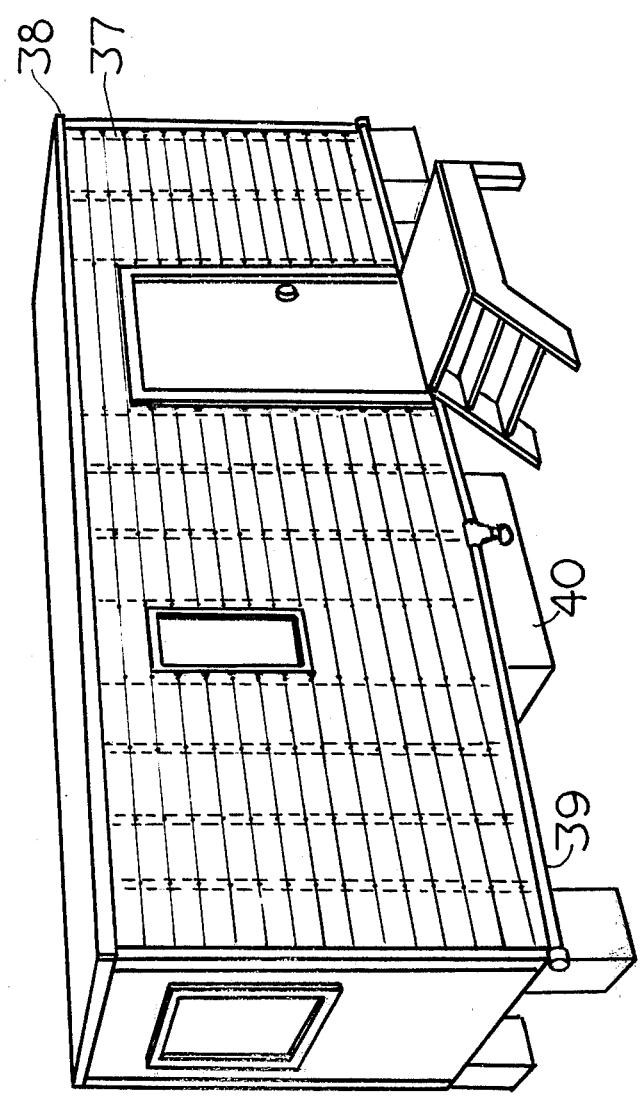
FIG. 4 is a perspective view of a mobile home with exterior siding made of collectors.

FIG. 4 illustrates the use of aluminum siding similar to that used by most mobile homes. Film tubes 37 are shown by dashed lines placed between the siding and plywood backing so as to convert the walls of the structure into solar energy absorbers. The siding has the form of the absorber sheet of the right hand collector of FIG. 2. A cap 38 covers the pipe used to supply liquid to the film tubes under the siding. Along the lower edge of the siding a pipe 39 removes liquid as it leaves the film tubes. The liquid is conducted to an insulated enclosure 40 below the trailer. Heated water from the collectors is stored in containers in this enclosure. Vents in the floor of the trailer allow heat from the containers to circulate up to the interior of the trailer. A heat exchanger may be used with these containers to provide domestic hot water. A pump and automatic control system are required to circulate water through the film tubes during suitable periods. During periods of warm weather, this system may be used to cool the walls of the trailer by circulating water through the tubes at night to cool it, and then circulating this cooled water through the tubes during the day to reduce wall temperature.

The configuration of the pinch seals used to form pockets need not be limited to the simple ridges shown in FIG. 2 and FIG. 3. Double or triple ridges and the use of compliant material behind each ridge as a means of improving the pinch seal are contemplated. The absorber sheet may be embossed with a pattern which will contribute to its stiffness and that of the pinch seal area, which may be further augmented by springs and stiffening elements.

To obtain temperatures from a collector which are high relative to atmospheric temperature, some type of glazing over the collector is essential. This glazing may take the form of plastic sheets bowed over the collector and attached directly to the base supporting the collector. Glazing may also be attached to or supported by a flange bent up from the edge of the absorber sheet. Heat loss through the metal of the absorber to the glazing will be slight if the absorber is made of a very thin material, as possible with the present invention.

It is also contemplated that the solar collectors of the present invention may be formed by sealing two sheets of plastic together to create two or more film tubes side by side. In creating a multiple number of film tubes in this manner, distribution passages may be formed at the upper ends of these film tubes so that liquid can be directed to more than one film tube from a single plumbing connection in the assembly. In a similar manner, a single plumbing connection may be used to remove liquid from multiple side-by-side film tubes created within two sheets of plastic, or one larger sheet folded in half and then sealed in a manner to create multiple film tubes and passages delivering liquid to them.

In these specifications the term "plastic" is used to indicate a flexible substance manufactured in sheet form. Examples of such material are nylon, teflon, mylar, lexan, polyethylene, polybutylene and various rubber-like materials such as butyl and latex. The plastic tubes may be extruded or formed by heat-sealing the edges of two sheets. The material used may be metalic-coated or metal-foil laminated. It may also use laminations of various plastics combined in a manner which emphasizes perperties unique to each of the layers of the lamination.

Because of the possibility of small leaks which may not adversely effect the solar energy collecting performance of a film tube but which may produce problems for the mounting surface under the collector by wetting it, film tubes may be used with one or more film tubes surrounding them. In this way the outer film tube acts as a conductor for leaks from the inner film tube and thereby protects the mounting surface from liquid contact.

The present invention presents a unique economic advantage to the builder in permitting the use of used offset printing plates for the absorber sheet with either overflow or pinch-seal pocket structures. These sheets are typically available in the range of from 0.008 to 0.011 inches thick. They are sufficiently strong to support the pressure created by liquid pockets approximately ten inches deep by ten inches wide. When formed with ridges to create pinch seals, they are effective for pockets approximately 10 inches wide by three inches deep. These aluminum sheets are typically available at considerably less cost than new sheets of the same size. The present invention provides a unique use for these sheets as they are too thin to tolerate the corrosion which would result from prolonged liquid contact and also too thin to be used with pressurized structures with significant internal pressures restrained by the sheets. However, the design of the present invention, through the use of a plastic film tube, protects the aluminum from liquid contact, and limits the pressure to which it is exposed to the depth of liquid in the pockets.

I claim:

1. A solar energy collecting device carrying a pressurizing, continuously flowing liquid for absorbing solar heat energy as the liquid flows through the device, comprising:

a pressurizing, continuously flowing liquid;

flexible tube means having an inlet located at an upper end thereof for receiving said liquid and an outlet located at a lower end thereof for discharging said liquid, said tube means includes a pair of thin, elongated, opposed, generally parallel side walls interconnected along side edges thereof to provide an enclosed passageway for carrying said liquid as it flows from said inlet to said outlet;

said side walls having means interconnecting said side walls for a portion of the distance between said side edges to divert said liquid laterally across said tube means during a portion of its travel from said inlet to said outlet;

means for supporting said tube means so that said liquid flows from said inlet to said outlet;

means for absorbing the solar energy overlying said tube means and contiguous therewith so that the energy received by said absorbing means is conducted to said pressurizing liquid flowing through said tube means; and means supplying liquid to be heated to said inlet and means to remove heated liquid from said outlet.

2. The device, as claimed in claim 1, further including:

at least one seal extending a portion of the distance between said side edges to interconnect said side walls.

3. The device, as claimed in claim 2, further including:

means contained within said tube means for limiting the pressure produced by said liquid flowing in said tube means.

4. The device, as claimed in claim 3, wherein said limiting means includes:

a passage means within said tube means located adjacent one of said side edges of said tube means to provide a pathway for receiving said liquid that overflows said seal as said liquid moves from said inlet to said outlet.

5. The device, as claimed in claim 4, wherein said limiting means further includes:
means for diverting said liquid from said passage means, wherein said diverting means includes said side walls of said tube means interconnected from one of said side edges for a portion of the distance between said side edges of said tube means.

6. The device, as claimed in claim 1, wherein said liquid supplying and removing means includes:
a first, single conduit means laterally extending through an opening in each of said side edges and located upwardly adjacent said inlet of said tube means, said first conduit means having an aperture to deliver unheated liquid to said inlet;
a second, single conduit means laterally extending through an opening in each of said side edges and located downwardly adjacent said outlet of said tube means, said second conduit means having a lateral slot to receive heated liquid from said outlet.

7. The device, as claimed in claim 1, wherein said absorbing means includes:
tensioning means for increasing a quantity of said pressurizing liquid contained in said tube mean as said liquid flows from said inlet to said outlet so that said flexible tube means expands outwardly as the liquid pressure increases in said tube means in the area along said tensioning means.

8. The device, as claimed in claim 7, wherein said tensioning means includes:
a plurality of spaced, inwardly-formed ridges contained on said absorbing means to press said tube means against said support means to removably seal said tube means.

9. The device, as claimed in claim 7, wherein said tensioning means includes:
spring means connected to edges of said absorbing means to restrict said liquid flow through said tube means thereby increasing the pressure being exerted by said liquid contained therein.

10. The device, as claimed in claim 8, wherein said tensioning means further includes:
a plurality of tabs interconnecting said absorbing means and said support means and located at edges thereof thereby pressurally securing said tube means therebetween.

11. The device, as claimed in claim 2, wherein said seal includes:
at least a first portion generally perpendicular to said side edges and extending between said side edges of said tube means and having at least one opening between said side edges to permit continuous longitudinal liquid flow therethrough.

12. The device, as claimed in claim 2, wherein said seal includes:
at least a first portion angularly extending between said side edges of said tube means and having at least one opening between said side edges to permit continuous longitudinal liquid flow therethrough.

13. The device, as claimed in claim 11, wherein said seal further includes:
a second portion parallel to said side edges of said tube means and extending from said perpendicular first portion.

14. The device, as claimed in claim 11, wherein said seal further includes:
a second portion extending angularly from said perpendicular first portion.

15. The device, as claimed in claim 12, wherein said seal further includes:
a second portion generally perpendicular to said side edges of said tube means and extending from said angularly extending first portion.

16. The device, as claimed in claim 12, wherein said seal further includes:
a second portion extending angularly from said angularly extending first portion.

17. The device, as claimed in claim 2, wherein said seal includes:
a first portion laterally extending for a portion of the distance between said side edges of said tube means and having a first and a second end and at least one opening adjacent said side edges;
a second portion longitudinally extending toward said inlet from said first end and connected to said first end;
a third portion longitudinally extending toward said inlet from said second end and connected to said second end;
said portions forming a pocket so that said liquid flowing through said tube means enters and completely fills said pocket before flowing thereout.

18. A solar energy collecting device carrying a pressurizing, continuously flowing liquid for absorbing solar energy, thereby heating the liquid as the liquid flows through the device, comprising:
a pressurizing, continuously flowing liquid;
flexible tube means having an inlet located at an upper end thereof for receiving said liquid and an outlet located at a lower end thereof for discharging said liquid, said tube means includes a pair of thin, elongated, opposed, generally parallel side walls interconnected along side edges thereof to provide an enclosed passageway for carrying said liquid as it flows from said inlet to said outlet;
said side walls having means interconnecting said side walls for a portion of the distance between said side edges to divert said liquid laterally across said tube means during a portion of its travel from said inlet to said outlet;
at least one seal extending a portion of the distance between said side edges to interconnect said side walls;
passage means contained within said tube means and located adjacent one of said side edges of said tube means to provide a pathway for receiving liquid that overflows said seal as the liquid moves from said inlet to said outlet;
diverting means contained within said passage means to deflect said liquid from said passage means, wherein said diverting means includes said side walls interconnected from one of said side edges of said tube means for a portion of the distance between said side edges;
means for supporting said tube means so that said liquid flows from said inlet to said outlet;
means for absorbing solar energy fastened to said support means and overlying said tube means and contiguous therewith so that the energy received by said absorbing means is conducted to the pressurizing liquid flowing through said tube means, wherein said absorbing means includes a rigid sheet having a plurality of spaced, inwardly-formed ridges pressurally applied to said tube means to increase the liquid pressure in said tube means and facilitate the conducting of solar energy to said liquid as it flows through said tube means;

a first, single conduit means laterally extending through an opening in each of said side edges and located upwardly adjacent said inlet of said tube means, said first conduit means having an aperture to deliver unheated liquid to said inlet;

a second, single conduit means laterally extending through an opening in each of said side edges and located downwardly adjacent said outlet of said tube means, said second conduit means having a lateral slot to receive heated liquid from said outlet.

19. The device, as claimed in claim 18, wherein said device further includes:

a plurality of flexible tube means positioned laterally adjacent each other.

20. The device, as claimed in claim 19, wherein:

said first, single conduit means is held on said support means and laterally extends through a pair of openings in each of said side edges of said plurality of tube means and is located upwardly adjacent each of said inlets of said plurality of tube means, said first conduit means having a plurality of apertures to deliver unheated liquid to each of said inlets of said tube means;

said second, single conduit means is held on said support means and laterally extends through a pair of openings in each of said side edges of said plurality of tube means and is located downwardly adjacent each of said outlets of said plurality of tube means, said second conduit having a lateral slot to receive heated liquid from each of said outlets of said tube means.

* * * * *